United States Patent [19]

Alfieri et al.

[11] Patent Number: 4,958,049

[45] Date of Patent: Sep. 18, 1990

[54] ELONGATED ELECTRICALLY INSULATING SUPPORT STRUCTURE AND RELEVANT PREPARATION METHOD

[75] Inventors: Massimo Alfieri; Zelindo Lodi; Gianfranco Trevisan, all of Parma, Italy

[73] Assignee: Fidenza Vetraria S.p.A., Milan, Italy

[21] Appl. No.: 169,040

[22] Filed: Mar. 16, 1988

[30] Foreign Application Priority Data

Mar. 19, 1987 [IT] Italy .................. 19753 A/87

[51] Int. Cl.$^5$ ............... H01B 17/56; H01B 19/00
[52] U.S. Cl. ................ 174/209; 156/172; 156/175; 174/178
[58] Field of Search ........... 174/138 D, 176, 177, 174/178, 179, 186, 209; 156/169, 172, 173, 175, 180; 464/181, 182, 183; 138/109, 130, DIG. 2; 43/18.5; 242/7.19

[56] References Cited

U.S. PATENT DOCUMENTS

| | | | |
|---|---|---|---|
| 3,877,523 | 4/1975 | Ely | 174/177 X |
| 3,898,372 | 8/1975 | Kalb | 174/179 |
| 4,248,062 | 2/1981 | McLain et al. | 464/181 |
| 4,319,076 | 3/1982 | Piur | 174/178 |
| 4,495,381 | 1/1985 | Timoshenko et al. | 156/172 X |
| 4,664,644 | 5/1987 | Kumata et al. | 156/172 X |

FOREIGN PATENT DOCUMENTS

| | | | |
|---|---|---|---|
| 718391 | 9/1965 | Canada | 156/173 |
| 2046774 | 3/1972 | Fed. Rep. of Germany | 174/158 R |
| 1470629 | 1/1967 | France | 174/179 |
| 576690 | 6/1976 | Switzerland | 174/177 |
| 1505875 | 3/1978 | United Kingdom | 174/178 |

OTHER PUBLICATIONS

Mier-Maza, R., et al., "Failure Analysis of Synthetic Insulators with Fiberglass Rod Submitted to Mechanical Loads", *IEEE Transactions on Power Apparatus and Systems*, vol. PAS-102, No. 9, Sep. 1983, pp. 3123-3130.
Soviet Inventions Illustrated, El Section, Week 8540, Nov. 13, 1985.
Soviet Inventions Illustrated, El Section, Week 8636, Oct. 15, 1986.

*Primary Examiner*—Laramie E. Askin
*Attorney, Agent, or Firm*—Stevens, Davis, Miller & Mosher

[57] ABSTRACT

An elongated electrically insulating support structure, for use by itself as an electrical insulator or for use as a strength member in a composite electrical insulator made of fiberglass-reinforced resin, comprising a central cylindrical body and ends having the shape of solids with surfaces of revolution with axial symmetry, having diameters larger than the diameter of the central cylindrical body, with which they are radiused without solution of continuity, i.e., connected without and discontinuity, wherein the central cylindrical body and the ends consist of superimposed and crossed layers of glass filament impregnated with thermosetting resin, wound around a cylindrical element with a helical winding angle smaller than 90°.

14 Claims, 1 Drawing Sheet

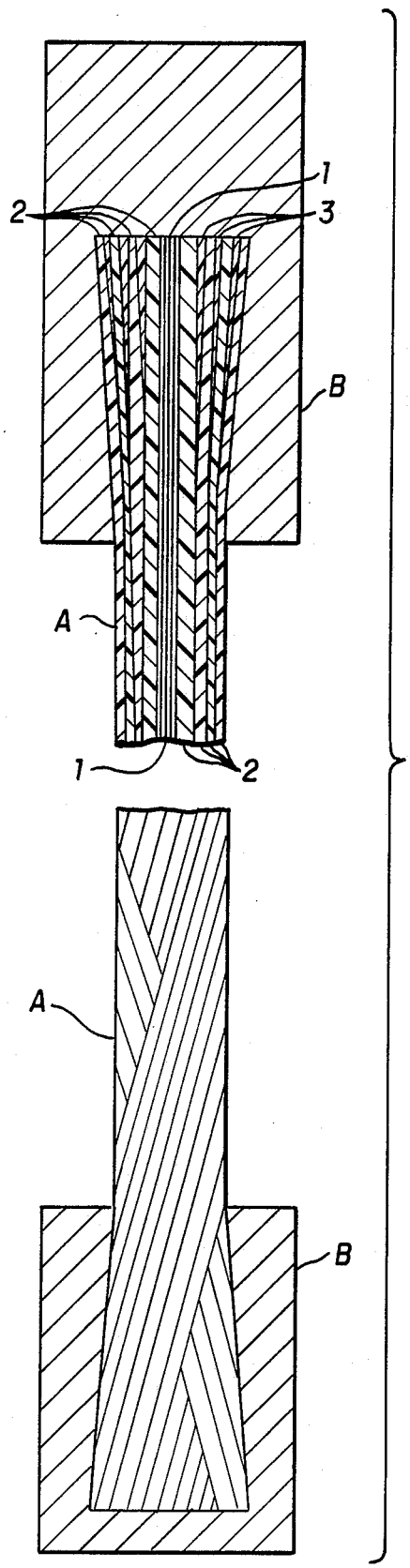

ELONGATED ELECTRICALLY INSULATING SUPPORT STRUCTURE AND RELEVANT PREPARATION METHOD

DESCRIPTION OF THE INVENTION

The present invention relates to an elongated electrically insulating support structure for use by itself as an electrical insulator or for use as a strength member in a composite electrical insulator, and to the method for preparing it.

It is known, e.g., from Italian Patent No. 1,114,909 (corresponding U.K. Patent No. 1,601,379), that is composite insulators with a ribbed covering of an organic material, the mechanical support function is entrusted to a central cylindrical component of fiberglass-reinforced resin.

Such component is generally manufactured as a solid cylindrical rod (either continuously or batchwise) by the pultrusion method, or by the method of stratification of fiberglass roving cloths, followed by a tool machining.

Another geometrical shape of the component is that of a hollow cylindrical body, obtained by the method consisting in filament winding of continuous fibers, impregnated with a thermosetting resin, with said continuous fibers being generally wound according to a helical pattern.

One of the critical points of these composit insulators turns out to be the connections, i.e., the connection with the end terminal parts destined to transmit the stresses from the insulators both towards the support elements, and towards the electrical conductors. The realization of these connections depends:

- on the geometrical shape of the end of the element of fiberglass-reinforced resin;
- on the geometrical shape of the metal part destined to be coupled with it;
- on the method used for connecting the above said fiberglass-reinforced resin element with the above said metal part; and
- on the technology used for partically accomplishing said connection.

The most common connections for composite insulators up to date used, or anyway known, are classified according to the essentiall geometries of the ends of the support structures, and of the fastening methods. Therefore, connections with cyhlindrical ends, with conical ends, or with ends wound on a metal insert, performing the function of terminals, exist.

For the first type, the solid cylindrical rods as previously described are used.

The connection is obtained by means of a radial compression stress, according to the following methods:

- plastic deformation of a cylindrical and hollow metal terminal, inside which the end of the rod is inserted, according to the technique of compression, as disclosed in U.S. Pat. No. 3,898,372;
- application of resin cones to the ends of the rod, and insertion inside metal terminals having opposite conicity (principle of Morse cones), as described in "IEEE Transactions of Power Apparatus and Systems", Volume PASS-102, No. 9, Sept. 1983, pages 3123–3130.

According to this latter method, the slipping of the cones on the rod is partially counteracted by adhesive forces and, mainly, by means of a pre-tensioning step, which generates strong radial stress components.

According to an alternative route, the cones of resin can be replaced by conical metal jaws.

The drawbacks of this first type of juncture are mainly due to the difficulty met in metering the radial compression stress sufficient to supply an axial component which is at least equal to the rated tensile stress of the insulator, but not so high as to endanger the strength of the end of the rod, considering that this is a permanent stress, destined to last throughout the lift of the insulator.

In the second type of juncture, with the support structure having conical ends, said conical ends are coupled with metal terminals having an opposite conicity, generally with the insertion of a filling material (either a resin or cement) capable of transmitting the stresses, according to techniques known for a long time in the art, and tested on "cap-and-pin" insulators and "rod" insulators of ceramic and glass.

The main differences between the various solutions derive from the technologies used to form the end cones which, in any case, have as their outer surface the resin-impregnated fiberglass.

The end cones can be formed either by means of the tool-machining of a cylindrical rod, or by acting on the end of the same rod during the polymerization of the resin, with the following geometries:

- tapered-end-shape (the diameter of the smallest cross-section of the cone is smaller than the diameter of the rod);
- threading;
- elliptical-cross-section cone obtained by "squashing" the cylindrical rod;
- wedge-shaped ends, by forcibly inserting a small-angle cone into the center of the end cross section of the end of the cylindrical rod.

The drawbacks of this second type of coupling reside in the methodology used for forming the cones, which requires either the removal of fiberglass in case of tool machining, or the deformation thereof during the polymerization, with an unavoidable weakening, in all cases, of the juncture, which thereupon becomes the weak point of the insulator.

The third type of connection, i.e., that type wherein the fiberglass is wound on a metal terminal provided with a shoulder, is disclosed in French Patent No. 1,390,405 (corresponding U.S. Pat. No. 3,261,910) and in French Patent No. 2,284,960 (corresponding UK Patent No. 1,505,875), relating to line insulators.

According to these patents, an insulating tube, filled with an expanding insulating material, is inserted inside two metal terminals provided with a shoulder having a suitable shape.

The glass filament, impregnated with resin, is wound, in a helical pattern, with a suitable winding angle, both the tube and the outer surfaces of the two metal terminals being such as the permanently connect them with each other. The whole structure is then coated with a ribbed insulating material.

The main drawbacks shown by this type of connection are the following:

- a larger diameter, with the strength being the same, and hence higher costs and larger overall dimensions of the external ribbed coating, inasmuch as both the tube and its filling do not transmit longitudinal stresses;

possibility a partial discharges, with consequent decay in insulation, due to the strong electrical gradient generated by the metal parts inserted in the tube, due to the possible presence of voids inside the tube filling; and poor protection against the penetration of moisture in correspondence of, and along, the surfaces of the metal parts, which, among others, are electrically separated from each other only by the tube of insulating material.

It has now been discovered, and this is the object of the present invention, that the above-mentioned drawbacks may be overcome by means of a support structure made of fiberglass-reinforced resin, comprising a central cylindrical body and ends having the shape of solids with surfaces of revolution, with axial symmetry, having diameters larger than those of the central cylindrical body, with which they are radiused without solution of continuity, i.e., connected gradually and without any discontinuity, wherein said central cylindrical body and said ends consist of superimposed and crossed layers of glass filaments impregnated with a thermosetting resin, wound around a cylindrical element with a helical winding angle smaller than 90°.

By the term "helical winding angle" as used in the instant disclosure and in the appended claims, the acute angle is understood which is formed between the projections, on the same longitudinal plane, of the wound filaments and of the longitudinal axis of the body.

In the support structure of the present invention, the ends having the shape of solids with surfaces of revolution, with axial symmetry, may be constituted by superimposed and crossed layers of glass filaments alternating, in the vicinity of the end portions of the central cylindrical body, with further layers of glass filaments wound with a winding angle larger than the winding angle of the helical winding.

As an alternative, said ends may consist of superimposed and crossed layers of glass filaments wound around a cylindrical element constituted by a cylinder of insulating material having the end portions already shaped as solids with surfaces of revolution, with axial symmetry, with diameters larger than the diameter of said cylinder.

A method for preparing the support structure of the present invention comprises:

(a) winding around a cylindrical element at least one continuous glass filament, impregnated with a thermosetting resin, with a helical winding angle smaller than 90°;

(b) alternating and superimposing upon the helical windings, in the vicinity of the end portions of the central cylindrical body, other windings, with a winding angle larger than the winding angle of the preceding (a) step; and (c) polymerizing and curing the impregnating resin.

The ends of the support structure, according to the present invention, have preferably the shape of a frustrum of a cone, and may be obtained by alternating, in correspondence to the end portions of the central cylindrical body to the superimposed and crossed layers of glass filaments, further layers of filaments wound with an approximately right winding angle, less and less extended in the longitudinal direction, and having their beginning more and more shifted towards the end sections, such as stepwise and gradually to increase the winding diameter.

A further method for preparing the support structure of the present invention comprises:

(a) winding at least one continuous glass filament, impregnated with a thermosetting resin, with a helical winding angle smaller than 90°, around a cylindrical element having its ends already shaped as solids with a surface of revolution, with axial symmetry, with diameters larger than the diameter of said cylindrical element; and (b) polymerizing and curing the impregnating resin.

The cylindrical element around which the helical winding of the continuous filament is applied, is preferably constituted by a bundle of parallel glass fibers impregnated with a resin.

This bundle, whose thickness is of a few mm, such as e.g., up to 10 mm, may be obtained by using the same filament used as the winding filament.

As an alternative, the cylindrical element may be constituted by solid cylinders of a few millimeters of diameter obtained, e.g., by pultrusion, or by hollow cylinders, to be filled with an insulating material; such cylinders may remain inserted inside the end article, provided that they have a good mechanical strength, optimum electrical qualities, physical properties similar to those of the wound article, and high enough elasticity to follow the deformations thereof.

As a second alternative, the winding may be started on rigid rods, of a metal material, to be removed at the end of the same winding step; the so-formed hollow may then be filled with an insulating material, or it may be left empty, when the use of the support structure as a bushing or hollow insulator is contemplated.

The helical winding angle is selected as a function of the stresses that the support structure of the present invention must withstand; preferred is an angle within the range of from 1° to 60°, and, more preferably, of from 5° to 30°, to endow the support structure with an axial tensile strength of the same order of magnitude as that of a parallel-fiber pultruded rod having the same diameter, with a strength of resistance to a radial component of the stress being at the same time obtained in the support structure.

Such a radial resistance is very useful in case of stresses different from pure tensile stresses, such as e.g., the stresses due to aeolian vibrations, to sudden load detachments, to unsymmetrical loads, and so forth.

The glass filament used to prepare the support structure of the present invention has a count preferably within the range of from 600 to 4,800 tex, and is preferably impregnated with cycloaliphatic epoxy resins, such as the epoxy resins based on diphenylolpropane and epichlorohydrin.

Further examples of thermosetting resins which may be used are vinyl ester resins, unsaturated polyester resins, polyurethane resins, and so forth.

Glass filament is preferred in the manufacture of the support structure of the present invention, because, besides being endowed with well-known excellent dielectric, chemical and physical properties, it gives the composite the optimum elasticity of this type of article.

The selection of the glass filament, to prepare the support structure of the present invention, should not be considered as limitative, however, inasmuch as filaments made from other materials having properties similar to glass may be used. Examples of such materials are the aramidic polymers used, e.g., in the preparation of Kevlar ® fibers.

The support structure of the present invention shows preferably ends in the shape of a frustrum of a cone, which are suitable for the assemblage with metal parts having opposite conicity, with the interposition of a bonding material, according to techniques known in the field of insulators, without suffering from the drawbacks due to such method of formation of the cones, as hereinabove described. In fact, the outer surface of the conical end is completely coated, with cross-wound layers, by the glass fiber, without solution of continuity, with a geometric precision and a uniform tension, is carefully impregnated with resin, and is polymerized and heat-cured in a heating apparatus, thus avoiding interruptions in the process, forced deformations or cutting of the fibers, as encountered in other methodologies.

Another advantage displayed by the support structure of the present invention relates to the ends of the support structure and the possibility of accurately radiusing them to the cylindrical portion, avoiding reductions in strength which are caused by sharp changes in cross section, typical of other structural solutions.

Due to the same reasons of uniformity in manufacturing, the same cylindrical portion shows not indifferent advantages as compared to the pultruded-rod solution, besides the advantages of withstanding stresses different from the already-described axial tensile stress; in pultruded rods, reductions in strength are likely to the easily found, which are due to the uneven pulling tension of the glass fibers, which are, all together, pulled parallelly to the extruder. An uneven co-operation and distribution of stresses between the fibers may derive therefrom, with a consequent reduction in tensile strength.

Support structures made of fiberglass-reinforced resin of the present invention may be used as such, as the mechanical strength element for any types of composite insulators for substations or for overhead electrical lines, and with any adequate types of covering. They may have diameters within the range of from 10 to 800 mm, and lengths within the range of from 100 mm to 6,000 mm.

They may furthermore be used with any voltage values, even larger than 300 kV, for alternating currents or for continuous currents, for both indoor and outdoor use.

In order still better to understand the support structure of the present invention, hereunder a description in greater detail follows, with reference to the figure of the attached drawing, which is a view of the support structure with one end in longitudinal section.

Referring to that figure, the support structure comprises the cylindrical central body (A) and the ends which are provided with metallic end fittings (B).

The cylindrical central body (A) comprises, in its turn, the cylindrical element (1), constituted by a bundle of filaments, and the superimposed and cross layers (2) which are obtained by winding the filament according to a helical pattern around the cylindrical element (1) as described above.

The ends, radiused to the central body without solution of continuity, comprise the cylindrical element (1), the layers (2), and the further layers (3) obtained by winding the filaments at a nearly right angle in correspondence to the end portions of the cylindrical element (1).

What is claimed is:

1. An elongated electrically insulating support structure, made of fiberglass-reinforced resin, comprising a central cylindrical body and ends having the shape of solids having a surface of revolution, with axial symmetry, having diameters larger than the diameter of the central cylindrical body, with which they are radiused without solution of continuity, wherein said central cylindrical body and said ends consist of superimposed and crossed layers of glass filament impregnated with a thermosetting resin wound with a helical winding angle smaller than 90°, wherein the superimposed and crossed layers of glass filament impregnated with a thermosetting resin are alternated, in the vicinity of the end portions of the cylindrical element, with further layers of glass filament impregnated with a thermosetting resin wound with a winding angle larger than the helical winding angle of said superimposed and crossed layers of glass filament impregnated with a thermosetting resin.

2. An elongated electrically insulating support structure, made of fiberglass-reinforced resin, comprising a central cylindrical body and ends having the shape of solids having a surface of revolution, with axial symmetry, having diameters larger than the diameter of the central cylindrical body, with which they are radiused without solution of continuity, wherein said central cylindrical body and said ends consist of superimposed and crossed layers of glass filament impregnated with a thermosetting resin, wound around a cylindrical element with a helical winding angle smaller than 90°, wherein the cylindrical element consists essentially of a cylinder of an insulating material having its end portions previously shaped as solids with surfaces of revolution, with axial symmetry, with diameters larger than the diameter of said cylinder.

3. Support structure according to claim 1 or 2, having a diameter within the range of from 10 to 800 mm, and a length within the range of from 100 to 6,000 mm.

4. Support structure according to claim 2, further including a cylindrical element around which the superimposed and crossed layers of glass filament impregnated with a thermosetting resin are wound.

5. A method for making an elongated electrically insulating support structure, comprising:
   (a) winding around a cylindrical element at least one continuous glass filament, impregnated with a thermosetting resin, with a helical winding angle smaller than 90;
   (b) alternating and superimposing upon the helical windings, in the vicinity of the end portions of the cylindrical element, other windings, with a winding angle larger than the winding angle of the preceding step (a); and
   (c) polymerizing and curing the impregnating resin.

6. Method according to claim 5, wherein said other windings form superimposed and crossed layers of glass filament and the ends of the support structure have a frusto-conical shape, and are obtained by alternating, in correspondence to the end portions of the cylindrical element, to the superimposed and crossed layers of glass filament, further layers of filament wound with an approximately right winding angle, less and less elongated in the longitudinal direction, and having their beginning more and more shifted towards end sections of the support structure in one of a stepwise and a gradual configuration to increase the winding diameter.

7. Method according to claim 5 or 6, wherein the cylindrical element comprises a bundle of parallel glass fibers impregnated with resin.

8. Method according to claim 7, wherein the fiber bundle is obtained from the same filament constituting said at least one continuous filament.

9. Method according to claim 5 or 6, wherein the cylindrical element comprises one of (a) solid cylinders, and (b) hollow cylinders adapted to be filled with an insulating material.

10. Method according to claim 5 or 6, wherein the cylindrical element comprises rigid rods adapted to be removed at the end of the winding step (b).

11. Method according to claim 5 or 6, wherein the helical winding angle of step (a) is within the range of from 1° to 60°.

12. Method according to claim 5 or 6, wherein the helical winding angle of step (a) is within the range of from 5° to 30°.

13. A method as in claim 6, wherein said other windings form layers of glass filament impregnated with a thermosetting resin.

14. A method for making an elongated electrically insulating support structure, comprising:
 (a) winding at least one continuous glass filament, impregnated with a thermosetting resin, with a helical winding angle smaller than 90°, around a cylindrical element having its ends previously shaped as solids with surfaces of revolution, with axial symmetry, with diameters larger than the diameter of said cylindrical element; and
 (b) polymerizing and curing the impregnating resin.

* * * * *